May 14, 1946. J. T. OBECNY 2,400,314
WORK HOLDER
Filed July 19, 1944 2 Sheets-Sheet 2
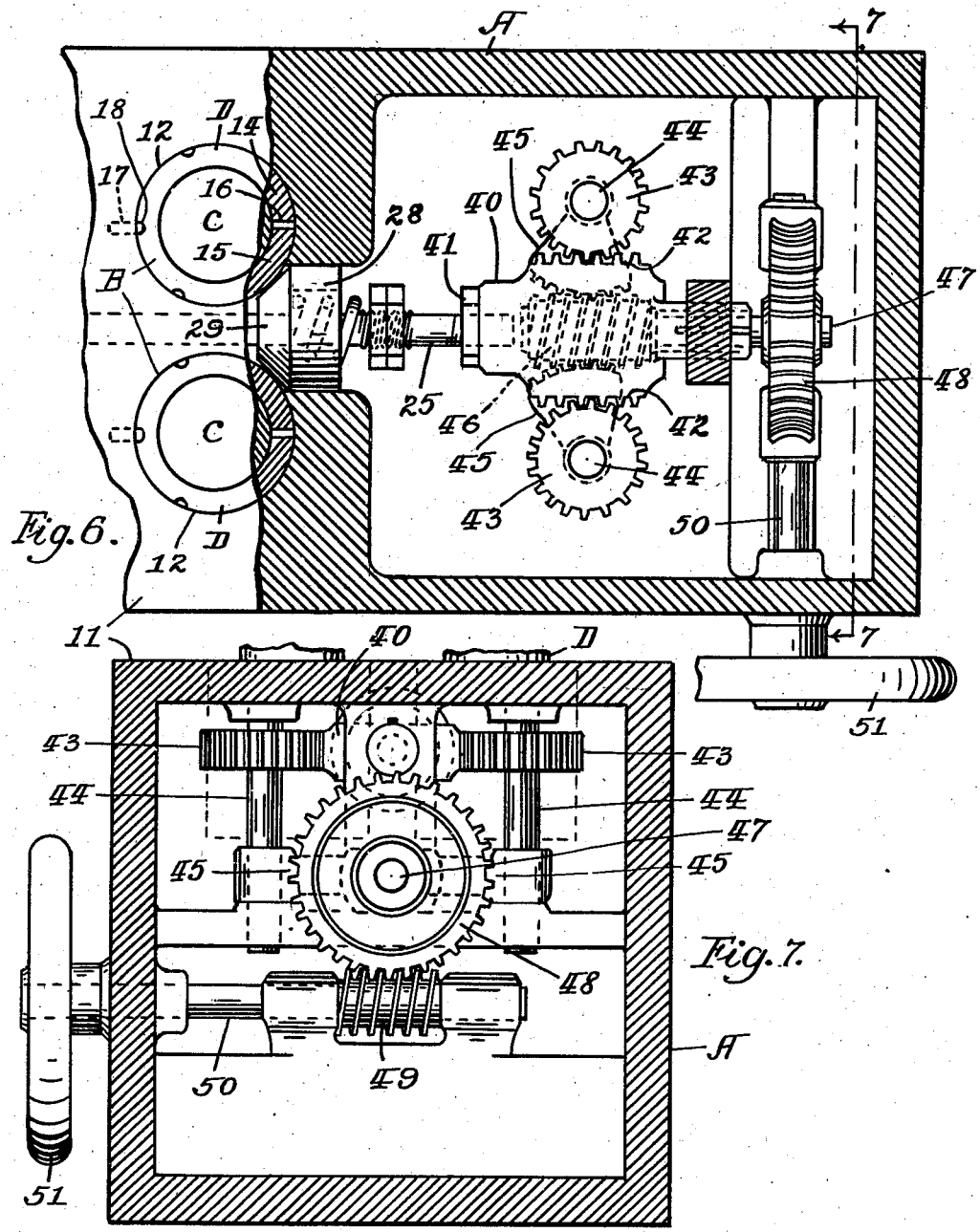
Inventor:
John T. Obecny.
by: [signature]
Attorney.

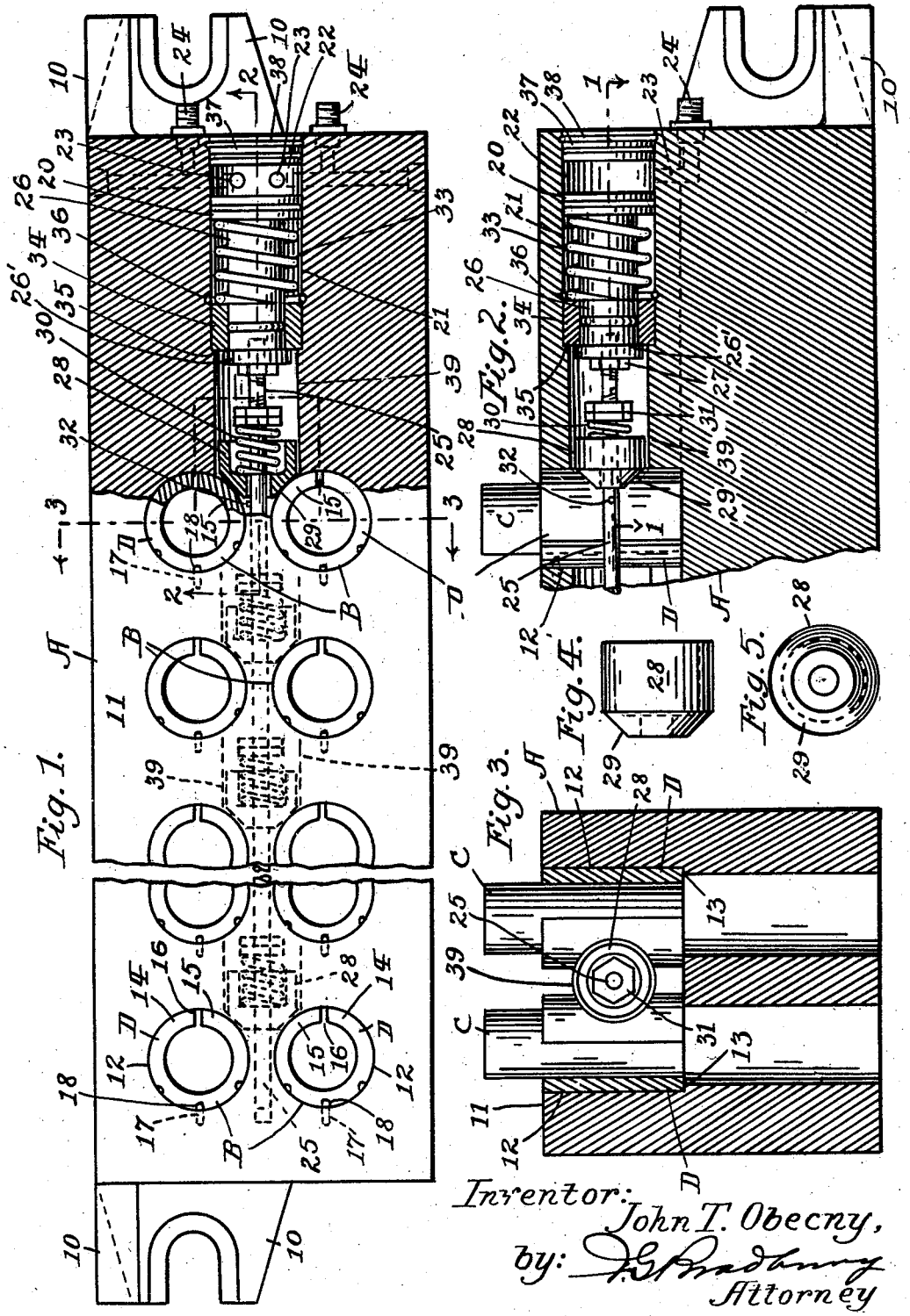

Patented May 14, 1946

2,400,314

UNITED STATES PATENT OFFICE 2,400,314

WORK HOLDER

John T. Obecny, Los Angeles, Calif.

Application July 19, 1944, Serial No. 545,683

6 Claims. (Cl. 90—59)

This invention relates to apparatus for holding work pieces or members in suitable position for multiple chucking operation in milling machines, shapers, drill presses, grinding machines and other machine tools. More particularly this invention is an improvement upon the construction of work holder set forth in my Patent No. 2,339,800; and my applications for patents for work holders filed on the 8th day of July, 1944, bearing Serial No. 544,071, and filed April 17, 1943, bearing Serial No. 483,501, and now Patent No. 2,366,979, granted January 9, 1945, of which latter application the present application is a continuation in part. One of the objects of the present invention is the production of a work holder which is extremely simple in construction, effective in use and inexpensive. A further object is the production of a work holder in which a maximum number of work pieces are securely held in operative position and in which a single pressure actuating means of any suitable type is applied in a simple and direct manner so that holding pressure is evenly distributed and equalized against a maximum number of work pieces simultaneously. A further object is the production of an apparatus by which no single work piece is permitted to move or slip while being machined or worked in any manner, whereby high precision work can be accomplished without failure to hold all of the work pieces rigidly in place. Among further objects and advantages is the saving of time and expense in the multiple production of machined articles and the correct and accurate positioning of work pieces for any type of machining or other work.

With the above objects and advantages in view, in addition to and including the principal objects and advantages set forth in my patent and applications for patent identified above, my invention comprises the features of construction and combination of parts hereinafter described and claimed.

In the accompanying drawings, forming part of this specification, Fig. 1 is a top plan of my improved work holder, a portion thereof being broken away to reduce space and a portion thereof being shown in section taken approximately on line 1—1 of Fig. 2; Fig. 2 is a section of a detail taken on the line 2—2 of Fig. 1; Fig. 3 is a cross section taken on the line 3—3 of Fig. 1; Fig. 4 is a side elevation of one of the collet compressors when removed from the apparatus; Fig. 5 is an end view of the structure shown in Fig. 4; Fig. 6 is a top plan of a detail of my improved work holder, a portion thereof being broken away and shown in horizontal section, said view showing a mechanical form of pressure operating means, and Fig. 7 is a section taken on the line 7—7 of Fig. 6.

In the drawings, A represents a supporting body which may be of any suitable shape, that shown being an oblong parallelopiped and provided with suitable horizontal and vertical slotted end bosses 10 by which it can be secured by bolting or clamping on the bed of a machine tool or other support to hold work pieces in suitable operative position for machining. One side of the body, which for convenience in describing my invention is termed the top surface 11, has a longitudinal series or rows of pairs of chuck units B, each unit of each pair consisting of a collet D and a cylindrical socket 12 in the body. Work pieces such as C (Fig. 3), to be cut, ground, polished or otherwise machined or worked are adapted to be held rigidly in vertical position by said collets. The collets of each chuck unit has its axis disposed vertically in the cylindrical socket 12 in the top surface of the body A. Each socket extends downwardly through the body and is formed with an annular shoulder 13 (Fig. 3), at a suitable distance below the top surface of the body to freely support the lower end of a work piece holding collet D in said socket. This collet normally corresponds with the socket in diameter and cylindrical shape and as shown resembles a longitudinally split hollow cylinder. The arcuate arms 14 and 15 of this cylinder are separated by a longitudinal space or gap 16. The collet is composed of spring material and is contractible against spring resistance while it is held in its chuck socket 12 to engage and immovably hold the shank of a work piece of any suitable shape in the work holder. Some of the types and shapes of collets which can be used in the chuck sockets 12 are set forth in my companion applications and patent above identified, to which reference is made for greater particularity. Thus the use of various designs and types of collets in suitable chuck sockets is contemplated.

Normally the collets are adapted to rest in their respective chuck sockets with their upper ends flush in the plane of the top surface 11 of the body and with their arcuate arms facing forwardly toward the head end of the body. Each collet is prevented from rotating in its chuck socket by a key 17 or other suitable means, said key being seated in the body and engaging in a longitudinal channel 18 in the outer wall of the collet. Thus by wrapping action of one or both of the arcuate arms of a collet a work piece is engaged and held securely in operative position.

The respective chuck units, that is each chuck socket 12 and its corresponding collet D are arranged in closely associated pairs, said pairs being arranged in an aligned series and providing two parallel longitudinal rows of collets, each row holding an aligned series of work pieces C, exposed in operative position on the body, whereby a machine tool can be applied to work two rows of work pieces simultaneously. The body A may be made of any suitable length to accommodate as many pairs of chuck units as desired.

The collets may be contracted by hydrostatic force which is provided by a single actuating unit for all of the collets, said force being distributed evenly so as to hold all of the work pieces under evenly applied pressure. The actuating or driving unit may be of hydraulic, mechanical, pneumatic or other type. As shown in Figs. 1 to 3 inclusive, it is of hydraulic type, that is a prime mover is provided in the form of a piston 20 which is adapted to reciprocate longitudinally in a cylinder 21, the latter being formed in the head end of the body A and in the vicinity of one end of the row of pairs of chuck units. The compression chamber 22 in the cylinder behind the piston is shown connected by ingress and egress ducts 23 for controlling the operation of the piston, said ducts being connected with adapters 24 on the end of the body by which a suitable source of hydraulic pressure fluid may be connected and controlled. The fluid pressure may be supplied and controlled from a remote source or it may be of hand operated type incorporated into the body and of that character described in my patent and copending applications above identified.

A plunger shaft 25 is reciprocably arranged in the body, longitudinally and horizontally between the members of the series of pairs of chuck units and substantially midway between the upper and lower ends of the chuck holding bores 12 (Fig. 2). As shown the shaft extends along a line which is transverse to the vertical axes of the several chuck units. This shaft is threadedly connected to the rear end of the piston rod 26 and is fastened by the lock nut 27, said piston rod being formed integral with piston 20 and extending rearwardly from the cylinder 21. In this manner the plunger shaft is adapted to be reciprocated by the piston. A collet compressor 28, consisting of a cylindrical body is freely disposed axially and laterally upon the plunger shaft between each pair of collets. The rearward end of each cylindrical compressor body 28 is conical and points rearwardly to provide a deflecting surface 29 which bears equally against the sides of the inner spring arcuate arms 15 of the forwardly directed members of each pair of collets so as to contract the members of each pair evenly when the plunger shaft 25 is reciprocated rearwardly through the operation of the piston 20. The compressors being freely disposed longitudinally upon and laterally about the shaft constitute floating members.

Each collet compressor 28 is urged rearwardly by the force of the shaft 25 and of a helical expansion spring 30, the force of which spring is adjusted on the shaft 25 by the lock nuts 31 which are threadedly engaged thereon so that the force exerted by the several collet compressors is equalized, thereby transmitting the driving force imparted by the shaft to the several pairs of collets. In this manner the members of all of the pairs of collets are contracted evenly and hold the work pieces under even pressure. A stop 32 on the shaft in the vicinity of each collet compressor serves to limit the rearward movement of the latter when the collets are removed from the chuck bores in the body. The collet compressors thus acting under the adjusted force applied by shaft 25 and compression springs 30 serve to equalize the work piece holding pressure which is applied to all of the pairs of collets, whereby the work pieces are held securely and any inequalities thereof are compensated. Also each compressor, through its floating action applies the force of compression evenly to the members of its companion pair of collets independently of the compensating means which is applied to the pairs.

To drive the shaft 25 rearwardly and compress all of the collets, hydraulic compression liquid is admitted into the fluid actuating chamber 22 through one of the operating ducts 23 leading from any source of hydraulic pressure supply. To release the collets the actuating shaft 25 is returned forwardly, through reverse reciprocation, by a master helical expansion spring 33 which is contained in the cylinder 21 and bears by its opposite ends against the piston 20 and a stop collar 34. The latter engages rearwardly against an annular shoulder 35 in the cylinder and is retained in place by the retaining ring 36. The compression chamber 22 is formed in the cylinder 21 by the inner end of piston 20 and a stopper 37 which is held in the cylinder by the split retainer 38. A bore 39 in continuation of the cylinder 21 in body A provides free passage containing the collet compressors 28 and their actuating elements. When the piston 20 is urged rearwardly by the application of sufficient hydraulic or other fluid pressure in chamber 22 the spring 33 is compressed and the shaft 25 is reciprocated rearwardly, thus freely applying the collet compressors against the spring arms 15 of each and every pair of collets, causing the latter to contract and hold work pieces in operative position under evenly applied pressure. When said pressure is released from chamber 20, all of the working parts are released and return into normal position and the work pieces are free to be removed. The forward stroke of the piston 20 and its connected shaft 25 is limited by an annular stop shoulder 26' on the piston rod 26 which strikes against the collar 34.

Thus it will be noted that each single compressor unit 28 serves to apply even operating pressure against the surfaces of the members of a single pair of collets to contract the latter and that by providing compensating means between the actuating shaft and all of the compressors the operating pressure is equalized and applied evenly to all of the pairs of compressors so that not only are the members of each pair of collets or chuck units applied evenly but all of the pairs are also evenly operated.

As many of the pairs of chuck units, actuated by a single shaft may be incorporated into a single structure as desired, also the actuating means may be varied and different types employed for simultaneously operating all of the chuck units under evenly applied pressure. In Figs. 6 and 7 I have shown a modified type in which the reciprocable shaft 25 is propelled rearwardly to apply the compressor units such as 28 and compress the pairs of collets such as D, into work piece holding position. This modification comprises a hand operable mechanism consisting of a rack 40, the body of which is coupled at 41 to the forward end of the reciprocable actuating shaft 25. This rack has a double set of rack teeth 42 on its opposite sides which are engaged and driven by the pinions 43. The pinions are journaled by vertical shafts 44 in the body A, said shafts in turn operating toothed quadrants 45 which are engaged and reciprocated by a worm pinion 46. The worm pinion is revolved by shaft 47 which is driven by a worm gear 48. The worm gear 48 is driven by the worm pinion 49 and the main drive shaft 50, the latter being journaled in the body and being driven by the hand operated wheel 51. This mechanism provides hand operated power multiplying means as a driving medium for reciprocating the actuating shaft 25. When set in collet compressed position this gearing will remain in work piece holding position automatically without slacking or releasing the collets.

In accordance with the patent statutes, I have described the principles of operation of my invention together with the construction thereof which I now consider to represent the best embodiment thereof, but I desire to have it understood that the construction shown is only illustrative and that the invention can be carried out by other means and applied to uses other than those above set forth within the spirit of the invention and within the scope of the following claims.

I claim:

1. In a holder of a plurality of work pieces, the combination of a body having a longitudinal series of transverse pairs of collet seats, a contractible collet in each seat having a socket for receiving a work piece to be clamped therein, a shaft reciprocable longitudinally between the members of the pairs of said seats, a collet compressor yieldably supported under predetermined pressure on said shaft having a deflecting surface bearing equally against the sides of the members of each pair of collets to contract said members when the shaft is thrust forwardly, an equalizing connection between each compressor and said shaft by which the driving force imparted by the reciprocation of said shaft forwardly is applied to evenly contract all of said collets, and means for reciprocating said shaft.

2. In a structure as defined by claim 1, the equalizing connection comprising a compression spring on the shaft directed against the compressor and adjusting means on the shaft for regulating the tension of said spring.

3. In a holder for a plurality of work pieces, the combination of a body having a pair of collet seats therein, a contractible collet mounted in each seat having a socket for receiving and holding a work piece, a pressure element having a tapering guide surface directed laterally against the walls of both collets to contract the latter, a drive shaft reciprocably disposed between said collets upon which said pressure element is slidably mounted, and resilient equalizing means directed against said pressure element having an adjustable connection with said shaft for varying the force applied by said pressure element.

4. In a holder for a plurality of work pieces, the combination of a body having a longitudinal series of transverse pairs of contractible chuck units, a shaft reciprocably disposed in said body between substantially all of the members of said chuck units, a cylindrical compressor body axially and reciprocably disposed on said shaft between each pair of chuck units, said compressor body having a deflecting surface bearing equally against the members of the companion pair of chuck units to compensate and contract the latter when said shaft is reciprocated, an equalizing spring interposed between each compressor body and the shaft having an adjustable connection with the spring for equalizing the pressure applied by all of the compressor bodies to the chuck units, and means for reciprocating said shaft.

5. A self-contained work holder, comprising, a body containing a series of pairs of contractible chuck units, a thrust shaft reciprocable longitudinally in said body between the members of the pairs of chuck units, pressure elements slidable on said shaft having compensated propelling connection therewith, each of said pressure elements having a bearing surface and one of the pressure elements being directed with its bearing surface against the members of each pair of chuck units to contract the latter when said shaft is reciprocated forwardly, and power multiplying mechanical gearing in said body connected with said shaft for reciprocating the latter and means for driving said gearing.

6. A self-contained work holder, comprising, a body containing a longitudinally aligned series of transverse pairs of contractible chuck units, a thrust shaft reciprocable longitudinally in said body between the members of the respective pairs of chuck units, pressure elements slidable on said shaft having compensating propelling connection therewith, each of said pressure elements having a bearing surface and one of the pressure elements being directed with its bearing surface against the members of each pair of chuck units to contract all of the chuck units simultaneously when said shaft is propelled forwardly, power multiplying rotary gearing in said body connected to said shaft having means for converting rotary driving force into the reciprocable movement of said shaft, and hand operable means for rotating the gearing.

JOHN T. OBECNY.